(12) United States Patent
Ichishima et al.

(10) Patent No.: US 9,235,504 B2
(45) Date of Patent: Jan. 12, 2016

(54) PRIORITIZING READ-COMMAND ISSUANCE IN A DATA STORAGE APPARATUS

(71) Applicant: KABUSHIKI KAISHA TOSHIBA, Minato-ku (JP)

(72) Inventors: Jun Ichishima, Kamakura (JP); Norifumi Tsuboi, Tokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 181 days.

(21) Appl. No.: 14/014,935

(22) Filed: Aug. 30, 2013

(65) Prior Publication Data
US 2015/0026388 A1 Jan. 22, 2015

Related U.S. Application Data

(60) Provisional application No. 61/846,671, filed on Jul. 16, 2013.

(51) Int. Cl.
G06F 12/02 (2006.01)
G06F 13/16 (2006.01)
G06F 12/06 (2006.01)

(52) U.S. Cl.
CPC ........ *G06F 12/0246* (2013.01); *G06F 12/0607* (2013.01); *G06F 13/1626* (2013.01); *G06F 2212/7206* (2013.01)

(58) Field of Classification Search
CPC ............ G06F 13/1605; G06F 13/1626; G06F 13/1647; G06F 13/18; G06F 12/0238; G06F 12/0246; G06F 12/0607
See application file for complete search history.

(56) References Cited

U.S. PATENT DOCUMENTS

| | | | |
|---|---|---|---|
| 2006/0179213 A1* | 8/2006 | Brittain et al. | 711/105 |
| 2008/0091906 A1* | 4/2008 | Brittain et al. | 711/167 |
| 2011/0185114 A1 | 7/2011 | Bolanowski | |
| 2012/0102262 A1 | 4/2012 | Nango et al. | |
| 2012/0278664 A1 | 11/2012 | Kazui et al. | |
| 2013/0318285 A1* | 11/2013 | Pignatelli | 711/103 |

* cited by examiner

*Primary Examiner* — Hal Schnee
(74) *Attorney, Agent, or Firm* — Oblon, McClelland, Maier & Neustadt, L.L.P.

(57) ABSTRACT

According to one embodiment, a storage control apparatus includes an interface and a controller. The interface transfers data or a command to or from a nonvolatile memory including a storage area for each of banks. The controller controls read operations for the banks in accordance with generation of access requests to the banks, respectively. The controller prioritizes performing read-command issuance processing included in each of the read operations.

15 Claims, 5 Drawing Sheets

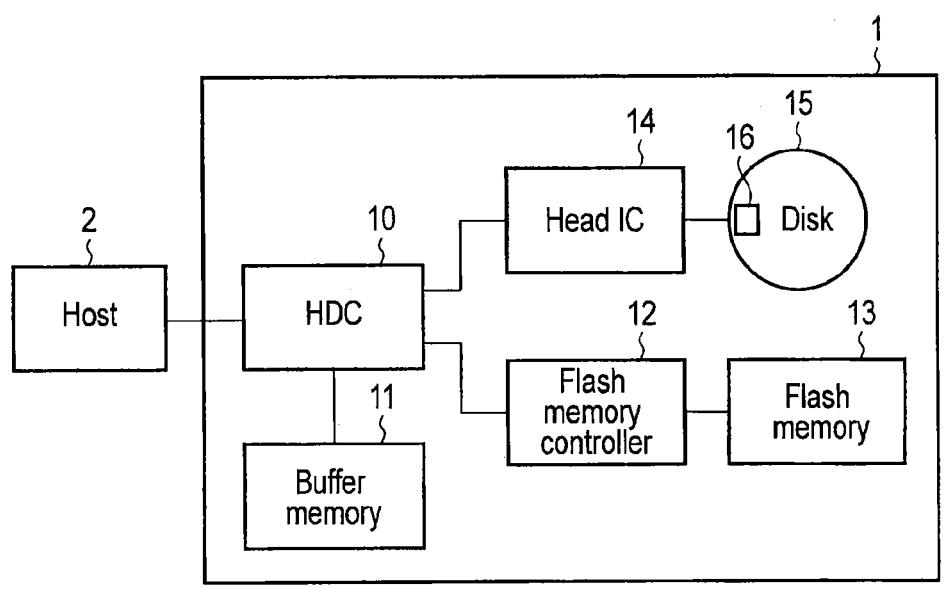
F I G. 1

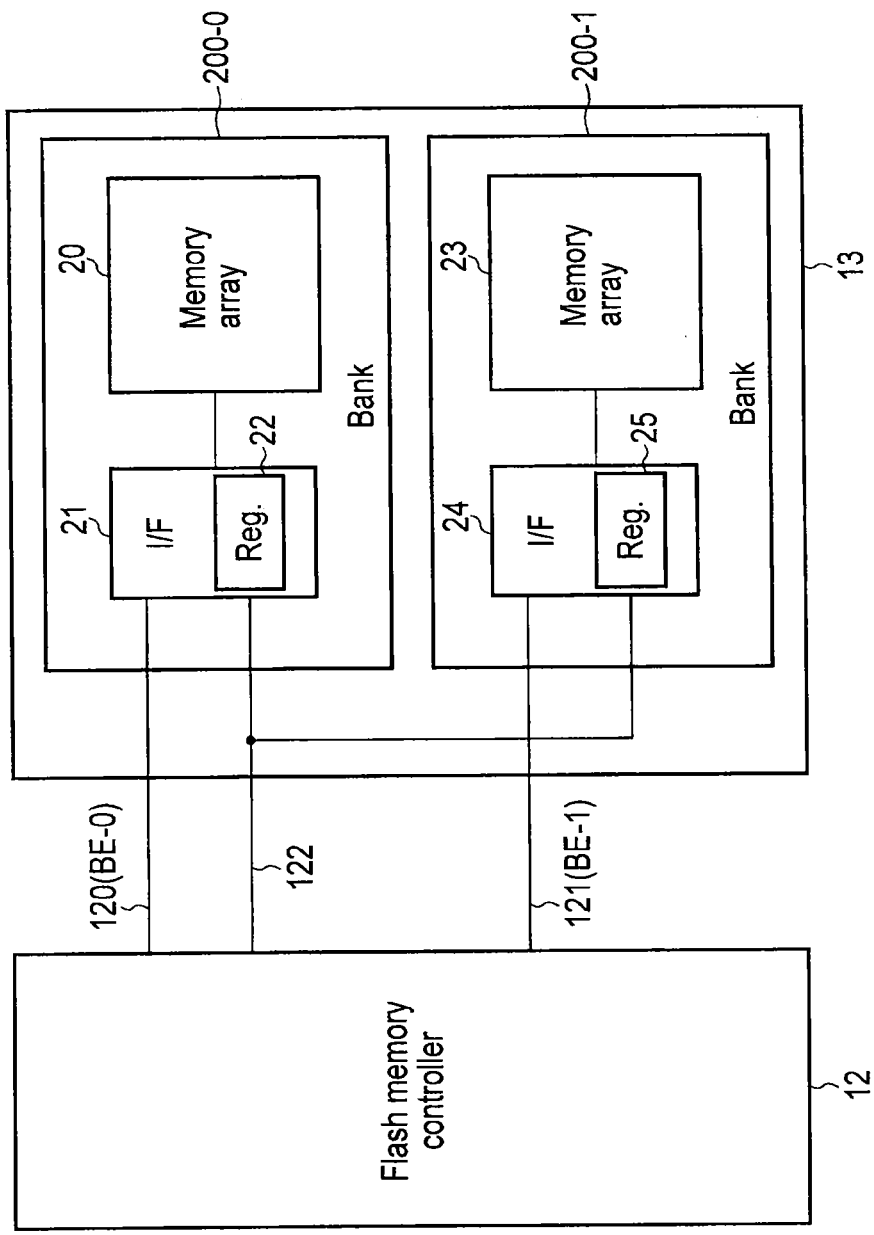
F I G. 2

PRIORITIZING READ-COMMAND ISSUANCE IN A DATA STORAGE APPARATUS

CROSS-REFERENCE TO RELATED APPLICATIONS

This application claims the benefit of U.S. Provisional Application No. 61/846,671, filed Jul. 16, 2013, the entire contents of which are incorporated herein by reference.

FIELD

Embodiments described herein relate generally to a storage control apparatus, a data storage apparatus and a memory control method.

BACKGROUND

Recently, as a data storage apparatus typically represented by a hard disk drive (HDD), a hybrid memory device which uses a nonvolatile memory such as a NAND flash memory (hereinafter simply referred to as a flash memory) together with a disk as storage media has been developed.

In such the hybrid storage apparatus, the flash memory comprises a storage area divided into a plurality of memory banks (hereinafter simply referred to as banks). A flash memory controller controls the flash memory in accordance with a so-called interleaving method which can simultaneously access to respective banks.

Here, an interface between the flash memory controller and the flash memory cannot transfer data simultaneously to the respective banks. Therefore, the flash memory controller has an arbitrator to arbitrate buses of the interface when a conflict occurs in access to a plurality of banks. By interleaving of the arbitrator, faster access is achieved.

However, in actual flash memory control, a series of processing including issuance of a read command needs to be performed for a read operation to read data from the flash memory. Therefore, simply performing arbitration with use of the interleaving method is not sufficient to reduce the time required for the read operation and to realize reading efficiency.

BRIEF DESCRIPTION OF THE DRAWINGS

FIG. 1 is a block diagram for explaining a configuration of a data storage apparatus according to an embodiment;

FIG. 2 is a block diagram for explaining a configuration and an interface of a flash memory according to the embodiment;

DETAILED DESCRIPTION

Figure 3:
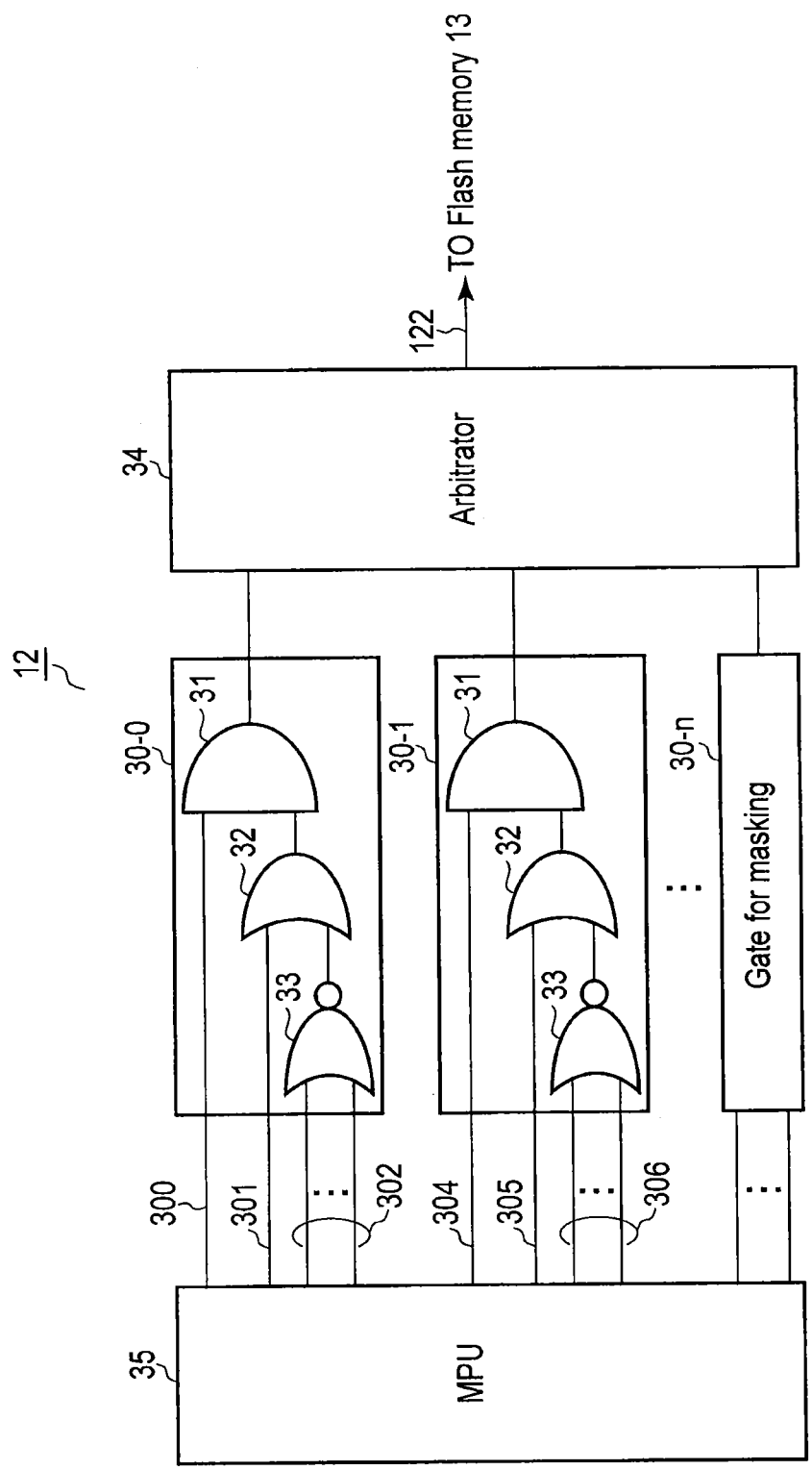
FIG. 3 is a block diagram for explaining a configuration of a flash memory controller.

Hereinafter, various embodiments will be described referring to the drawings.

In general, according to one embodiment, a storage control apparatus includes an interface and a controller. The interface transfers data or a command to or from a nonvolatile memory including a storage area for each of banks. The controller controls read operations for the banks in accordance with generation of access requests to the banks, respectively. The controller prioritizes performing read-command issuance processing included in each of the read operations.

Configuration of Disk Drive

FIG. 1 is a block diagram which shows a main part of a hybrid hard disk drive (hereinafter referred to as a hybrid HDD) as a data storage apparatus according to the embodiment. As shown in FIG. 1, a hybrid HDD 1 comprises a hard disk controller (HDC) 10, a buffer memory 11, and a flash memory controller 12.

The HDC 10 controls an interface between the hybrid HDD 1 and a host 2, and controls a read operation and a write operation of data with respect to a disk 15 which will be described later. The buffer memory 11 may be, for example, a dynamic random access memory (DRAM). The buffer memory 11 temporarily stores read data or write data, to control data transfer to and from the host 2.

The hybrid HDD 1 comprises a flash memory 13 and a disk 15 as storage media. The HDC 10 writes data to or reads data from the flash memory 13 through the flash memory controller 12. The HDC 10 controls a head-amplifier integrated circuit (head IC) 14 and a head 16, and writes data to or reads data from the disk 15.

FIG. 2 is a diagram for explaining a configuration of the flash memory 13 and the interface to the flash memory controller 12.

As shown in FIG. 2, the flash memory 13 comprises a plurality of independent banks 200-0 and 200-1. Banks 200-0 and 200-1 respectively comprise memory arrays 20 and 23, each of which is a group of memory chips. Further, banks 200-0 and 200-1 respectively comprise interfaces 21 and 24 connecting to the flash memory controller 12.

Interfaces 21 and 24 respectively comprise registers 22 and 25 which temporarily store data read from memory arrays 20 and 23. Interfaces 21 and 24 are connected to interface buses 120 to 122 to transfer enable signals and data to and from the flash memory controller 12.

The flash memory controller 12 can read data independently from banks 200-0 and 200-1 through interface buses 120 to 122. The embodiment will now be described with reference to a read operation of reading data from the flash memory 13, and a description of a write operation of writing data to the flash memory 13 will be omitted.

The flash memory controller 12 transmits an enable signal BE-0 through interface bus 120 when an access request (hereinafter also simply referred to as a request) is made to bank 200-0. Further, the flash memory controller 12 transmits an enable signal BE-1 through interface bus 121 when a request is made to bank 200-1.

The flash memory controller 12 receives data read from any of bank 200-0 and 200-1 through the common interface bus 122 in response to a request to banks 200-0 and 200-1. Namely, the flash memory controller 12 cannot simultaneously perform data transfer to banks 200-0 and 200-1 through interface bus 122.

FIG. 3 is a diagram showing a main part of the flash memory controller 12. As FIG. 3 shows, the flash memory controller 12 comprises mask gates 30-0 to 30-n, an arbitrator 34, and a microprocessor unit (MPU) 35, and performs interleaving.

Mask gates 30-0 to 30-n have the same configuration as each other which comprises an AND gate 31, an OR gate 32, and a NOR gate 33. The MPU 35, as will be described later, outputs requests 300 and 304 to banks 200-0 and 200-1, and information which indicates read command attributes (hereinafter referred to as RC attributes, for convenience) 301, 302, 305, and 306. Namely, mask gates 30-0 to 30-n mask commands other than read commands when requests are issued to banks 200-0 and 200-1.

The arbitrator 34 performs arbitration according to a Least Recently Used (LRU) method, or arbitration according to a round robin method. Namely, the arbitrator 34 performs arbitration for interface bus 122 when a conflict occurs between requests to banks 200-0 and 200-1.

Read Operation

Hereafter, the read operation of the embodiment will be described with reference to the FIGS. 4A, 4B, 4C, 4D, and 4E, and FIG. 5.

FIGS. 4A to 4E each are a timing chart showing a series of processing of performing the read operation in which the flash memory controller 12 reads data from the flash memory 13. FIG. 5 is a flowchart which particularly shows a series of processing procedures of the flash memory controller 12 shown in FIG. 3.

Figure 4:
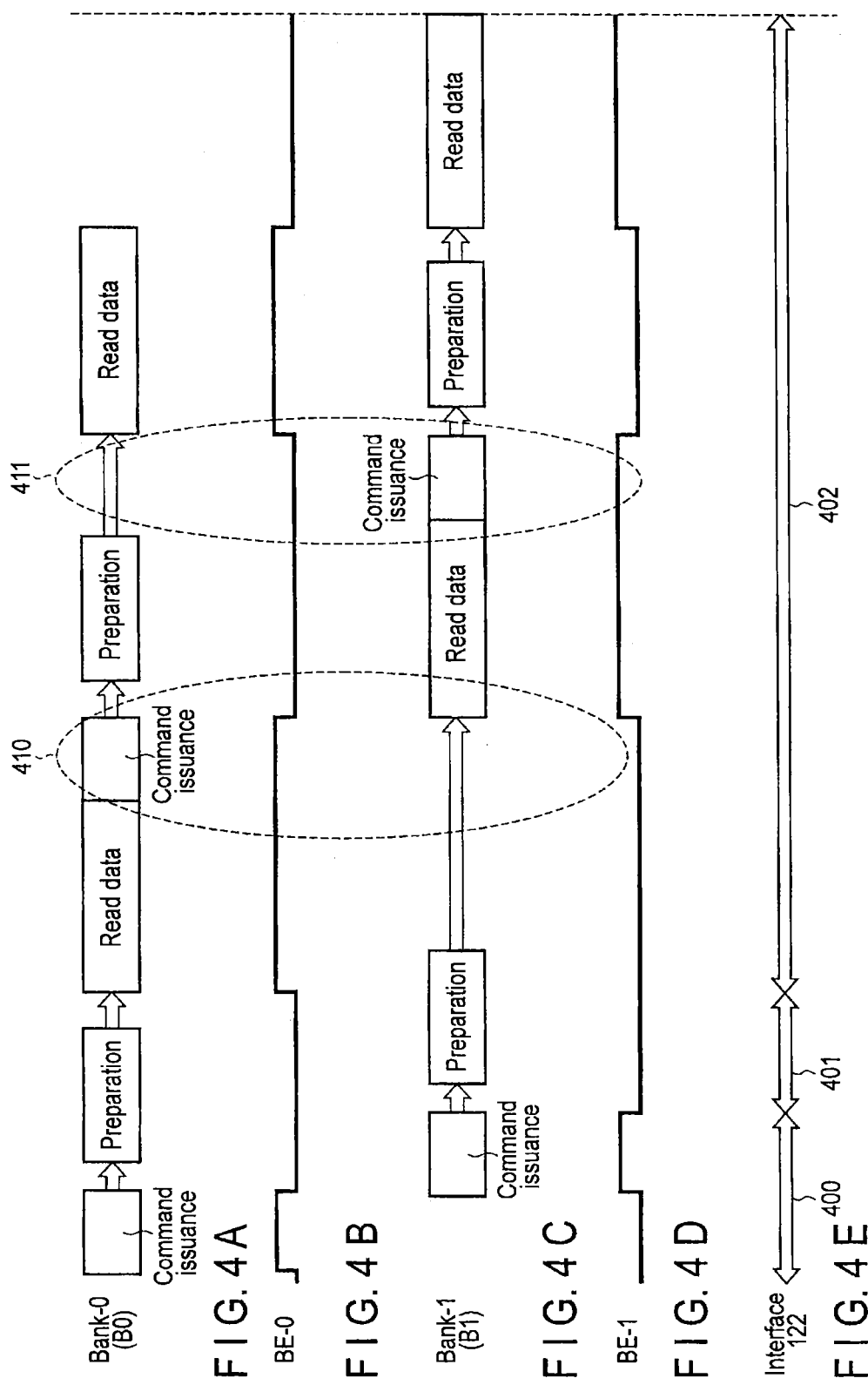
FIGS. 4A, 4B, 4C, 4D, and 4E are timing charts for explaining a read operation according to the embodiment.
Figure 5:
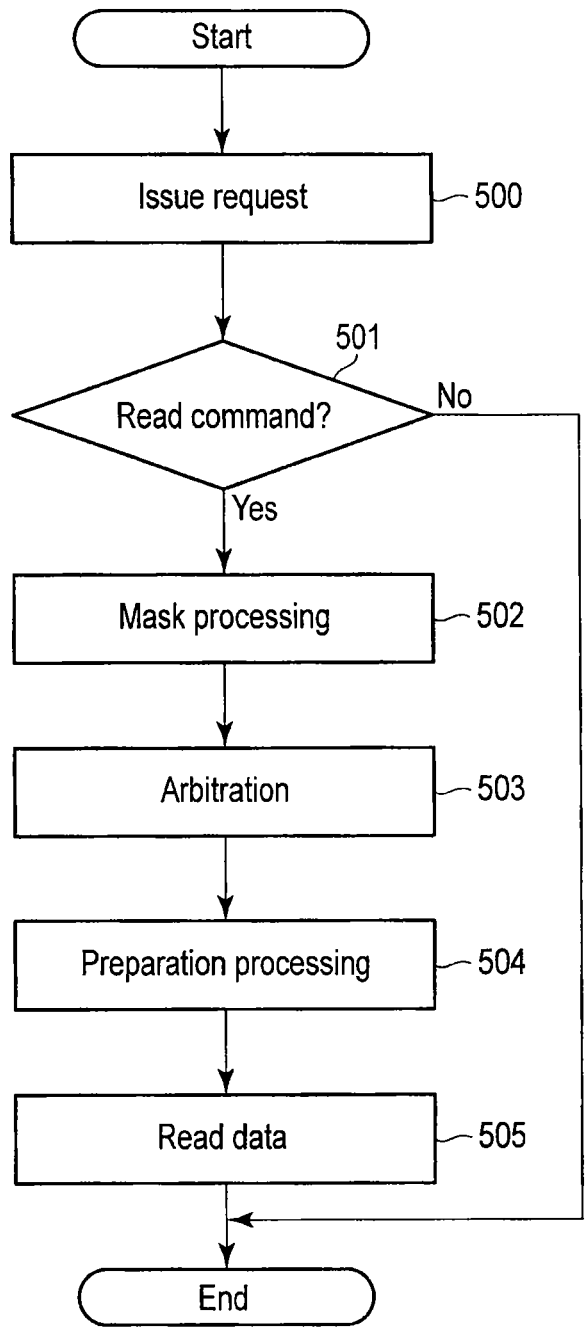
FIG. 5 is a flowchart for explaining a read operation according to the embodiment.

As FIGS. 4A and 4B show, in the read operation for bank 200-0, a series of processing comprising a read command issuance, preparation processing, and reading are performed in accordance with output of enable signal BE-0 from the flash memory controller 12. As FIGS. 4C and 4D shown, in the read operation for bank 200-1, a series of processing comprising a read command issuance, preparation processing, and reading are performed in accordance with output of enable signal BE-1 from the flash memory controller 12.

The aforementioned preparation processing includes, as FIG. 2 shows, processing of transfer up to storage of data from memory arrays 20 and 23 to registers 22 and 25. The preparation processing is also called Data Transfer from Flash Array to Register (TR), for convenience, and is a wait time in the read operation. As FIG. 4E shows, in some occasions, interface bus 122 is not used for requests or data transfer during the TR processing (Section 401).

Meanwhile, in FIG. 4E, sections 400 and 402 denote time periods during which interface bus 122 is used for requests or data transfer. Namely, in the read processing, data stored in registers 22 and 25 are transferred to the flash memory controller 12 through interface bus 122.

Further, a specific description will be made with reference to the flowchart of FIG. 5.

In the flash memory controller 12, the MPU 35 issues the request 300 to bank 200-0 (Block 500). In this case, the flash memory controller 12, as FIG. 2 shows, transmits enable signal BE-0 to bank 200-0 through interface bus 120. Further, in case of a read access request (namely an issuance request for a read command), the MPU 35 issues the RC attribute 301 along with the request 300 (YES in Block 501). Otherwise, if the request is not a read access request, the processing according to the embodiment is terminated and transits to other processing (NO in Block 501).

As shown in FIG. 3, mask gate 30-0 for bank 200-0 outputs a message signal of logical 1 to the arbitrator 34 from the AND gate 31 in accordance with the request 300 of logical 1 and the RC attribute 301 (Block 502). The arbitrator 34 performs arbitration in a way to issue a read command to bank 200-0 through interface bus 122 (Block 503). Namely, as shown in FIG. 4A, read-command issuance is performed on bank 200-0 in accordance with output of enable signal BE-0. In this case, as shown in FIG. 4E, interface bus 122 transmits a read command to bank 200-0 (section 400).

In bank 200-0, interface 21 performs preparation processing in which the data designated by a read command is transferred to register 22 from memory array 20 (Block 504). As shown in FIG. 4E, interface bus 122 is not used for data transfer (Section 401). Interface 21 performs read processing in which data is transferred from register 22 to the flash memory controller 12 through interface bus 122 (Block 505).

Next, in the flash memory controller 12, when a read access request for bank 200-1 is generated, the MPU 35 issues the request 304 for bank 200-1 in a similar manner to the above. The flash memory controller 12, as shown in FIG. 2, transmits enable signal BE-1 to bank 200-1 through interface bus 121. Further, the MPU 35 issues the RC attribute 305 along with the request 304.

As shown in FIG. 3, mask gate 30-1 for bank 200-1 outputs a message signal of logical 1 to the arbitrator 34 from the AND gate 31 in accordance with the request 304 of logical 1 and the RC attribute 305. The arbitrator 34 issues a read command for bank 200-1 through interface bus 122. Namely, as shown in FIG. 4C, read-command issuance is performed for bank 200-1 in accordance with output of enable signal BE-1. In this case, as shown in FIG. 4E, interface bus 122 transmits a read command to bank 200-1 (Section 400).

In bank 200-1, interface 24 performs preparation processing in which the data designated by the read command is transferred to register 25 from memory array 23. In this case, as shown in FIG. 4E, interface bus 122 is not used for data transfer (Section 401).

Here, as shown in FIG. 4A, interface 21 of bank 200-0 is performing read processing in which data is transferred from register 22 to the flash memory controller 12. Therefore, interface bus 122 is in use, and accordingly, interface 24 of bank 200-1 is in a state that data-read processing cannot be performed (Section 402). That is, interface 24 can start the read processing after the read processing for bank 200-0 is completed.

In the embodiment, the MPU 35 issues the RC attribute 301 along with the request 300 to bank 200-0 after the read processing for bank 200-0 is completed (Block 500 and YES in Block 501). As shown in FIG. 3, mask gate 30-0 for bank 200-0 outputs a message signal of logical 1 to the arbitrator 34 from the AND gate 31 in accordance with the request 300 of logical 1 and the RC attribute 301 (Block 502).

Namely, interface bus 122 is in a state that the read-command issuance for bank 200-0 and the read processing for bank 200-1 conflict with each other (a dotted line 410 in FIGS. 4A and 4C). The arbitrator 34 performs arbitration of interface bus 122 in accordance with the message signal output from mask gate 30-0, in a way to prioritize the read-command issuance for bank 200-0.

Therefore, as shown in FIG. 4E, interface bus 122 transmits the read command to bank 200-0 (section 402). In bank 200-0, interface 21 performs preparation processing (block 504). At this time, interface bus 122 performs data transfer in accordance with the read processing of bank 200-1.

As shown in FIG. 4C, the MPU 35 issues the RC attribute 305 together with the request 304 to bank 200-1 after the read processing for bank 200-1 is completed. As shown in FIG. 3, mask gate 30-1 to bank 200-1 outputs a message signal of logical 1 to the arbitrator 34 from the AND gate 31 in accordance with the request 304 of logical 1 and the RC attribute 305.

Namely, interface bus 122 is in a state that the read-command issuance for bank 200-1 and the read processing for bank 200-0 conflict with each other (dotted line shown in FIGS. 4A and 4C). The arbitrator 34 performs arbitration for interface bus 122 in accordance with a message signal output from mask gate 30-1, in a way to prioritize the read-command issuance to bank 200-1.

Therefore, as shown in FIG. 4E, interface bus 122 transmits a read command to bank 200-1 (section 402). In bank 200-1, interface 24 performs the preparation processing. At this time, interface bus 122 performs data transfer in accordance with the read processing of bank 200-0 (block 505).

As described above, according to the embodiment, interleaving that performs a read access request independently to each of banks can be efficiently performed by arbitration of interface buses. Namely, when accesses to the banks conflict with each other, arbitration is performed prioritizing read-command issuance for each of the banks. In this manner, in the read operation for each of the banks, sections for which interface buses are not used due to overlapping of preparation processing for the banks can be reduced when a series of processing comprising read-command issuance, preparation processing, and read processing is performed. In other words, by prioritizing read-command issuance for one bank, read processing for the other bank can be performed in a next preparation processing section.

Therefore, sections for which interface buses are not used can be reduced, and accordingly the entire processing time required for read operations for the respective banks can be shortened and be more efficient. By application of the embodiment, speed-up of read operations in a flash memory of a hybrid HDD is realized, and accordingly, high-performance hybrid HDDs can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus for a storage apparatus comprising a plurality of nonvolatile memory arrays comprising:
    a plurality of interfaces, each of the plurality of interfaces being connected to a respective one of the plurality of nonvolatile memory arrays; and
    a controller connected to each of the plurality of interfaces via a bus and configured to perform read operations for the plurality of nonvolatile memory arrays, each of the read operations including
        issuing a read command to one of the plurality of interfaces,
        transferring data from one of the plurality of nonvolatile memory arrays to the respective one of the plurality of interfaces, and
        reading data from the respective one of the plurality of interfaces,
        wherein a higher priority is given to the issuance of a first read command for a first nonvolatile memory array of the plurality of memory arrays than reading data from the interface connected to a second nonvolatile memory array of the plurality of memory arrays.

2. The control apparatus of claim 1, wherein the controller is configured to output the first read command to the interface connected to the first memory array, and to mask other commands than the first read command.

3. A data storage apparatus comprising:
    a plurality of nonvolatile memory arrays;
    a plurality of interfaces, each of the plurality of interfaces being connected to a respective one of the plurality of nonvolatile memory arrays; and
    a controller connected to each one of the plurality of interfaces via a bus and configured to perform read operations for the plurality of nonvolatile memory arrays, each of the read operations including
        issuing a read command to one of the plurality of interfaces,
        transferring data from one of the plurality of nonvolatile memory arrays to the respective one of the plurality of interfaces, and
        reading data from the respective one of the plurality of interfaces,
        wherein a higher priority is given to the issuance of a first read command for a first nonvolatile memory array of the plurality of memory arrays than reading data from the interface connected to a second nonvolatile memory array of the plurality of memory arrays.

4. The data storage apparatus of claim 3, wherein the controller is configured to output the first read command to the interface connected to the first memory array, and to mask other commands than the first read command.

5. A method of controlling a data storage apparatus including a plurality of nonvolatile memory arrays, a plurality of interfaces, and a controller, each of the plurality of interfaces being connected to a respective one of the plurality of nonvolatile memory arrays, the controller being connected to each of the plurality of interfaces via a bus, the method comprising:
    performing read operations for the plurality of nonvolatile memory arrays, each of the read operations comprising
        issuance of a read command to one of the plurality of interfaces;
        transferring data from one of the plurality of nonvolatile memory arrays to the respective one of the plurality of interfaces; and
        reading data from the respective one of the plurality of interfaces, wherein a higher priority is given to the issuance of a first read command for a first nonvolatile memory array of the plurality of memory arrays than reading data from the interface connected to a second nonvolatile memory array of the plurality of memory arrays.

6. The method of claim 5, further comprising outputting the first read command to the interface connected to the first memory array, and masking other commands than the first read command.

7. The control apparatus of claim 1, wherein
each of the plurality of interfaces comprises:
a register, wherein
each of the read operations comprises issuance of a read command to one of the plurality of interfaces, transferring data from the respective nonvolatile memory to the register, and reading data from the register.

8. The control apparatus of claim 1, wherein
the first read command for the first nonvolatile memory array is issued after data is transferred from the second nonvolatile memory array to the respective one of the plurality of interfaces.

9. The control apparatus of claim 1, wherein
the first read command for the first nonvolatile memory array is issued during a data transfer from the second nonvolatile memory array to the respective one of the plurality of interfaces.

10. The data storage apparatus of claim 3, wherein
each of the plurality of interfaces comprises a register, and wherein each of the read operations comprises issuance of a read command to one of the plurality of interfaces, transferring data from the respective nonvolatile memory array to the register, and reading data from the register.

11. The data storage apparatus of claim 3, wherein the first read command for the first nonvolatile memory array is issued after data is transferred from the second nonvolatile memory array to the respective one of the plurality of interfaces.

12. The data storage apparatus of claim 3, wherein the first read command for the first nonvolatile memory array is issued during a data transfer from the second nonvolatile memory array to the respective one of the plurality of interfaces.

13. The method of claim 5, wherein each of the plurality of interfaces comprises a register, and wherein each of the read operations comprises issuance of a read command to one of the plurality of interfaces, transferring data from the respective nonvolatile memory array to the register, and reading data from the register.

14. The method of claim 5, wherein the first read command for the first nonvolatile memory array is issued after data is transferred from the second nonvolatile memory array to the respective one of the plurality of interfaces.

15. The method of claim 5, wherein the first read command for the first nonvolatile memory array is issued during a data transfer from the second nonvolatile memory array to the respective one of the plurality of interfaces.

\* \* \* \* \*